VAN VECHTON RIESBERG.
AIR VALVE FOR RADIATORS.
APPLICATION FILED MAR. 3, 1917.

1,275,750.

Patented Aug. 13, 1918.

WITNESS
F. J. Hartman.

INVENTOR
Van Vechton Riesberg,
BY Fritz v Blount,
ATTORNEYS

UNITED STATES PATENT OFFICE.

VAN VECHTON RIESBERG, OF PHILADELPHIA, PENNSYLVANIA, ASSIGNOR OF ONE-HALF TO FRANK H. DOUGHERTY, OF PHILADELPHIA, PENNSYLVANIA.

AIR-VALVE FOR RADIATORS.

1,275,750.

Specification of Letters Patent.   Patented Aug. 13, 1918.

Application filed March 3, 1917.   Serial No. 152,176.

*To all whom it may concern:*

Be it known that I, VAN VECHTON RIESBERG, a citizen of the United States, and a resident of the city of Philadelphia, county of Philadelphia, and State of Pennsylvania, have invented certain new and useful Improvements in Air-Valves for Radiators, of which the following is a specification, reference being had to the accompanying drawing.

My invention relates to valves for permitting the escape of cold air or vapor from radiators and preventing the escape of steam, or other heating medium, therefrom, among the principal objects of my invention being to provide an air valve adapted for this purpose of novel and improved construction and extremely sensitive in operation. Further objects of my invention are to provide a valve of this character which comprises but a minimum number of parts and which may be economically manufactured; which is not liable to get out of order; which affords a substantially unrestricted passage for the escape of the air and which in operation effects a considerable saving in the steam or other heating medium employed.

My invention further includes all of the other various novel objects and features of construction and arrangement, hereinafter more definitely specified and described.

Figure 1:
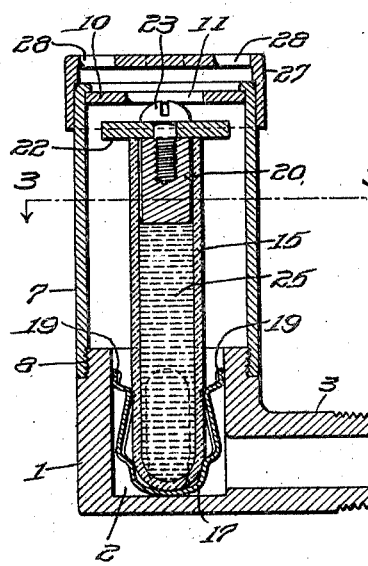
Figure 2:
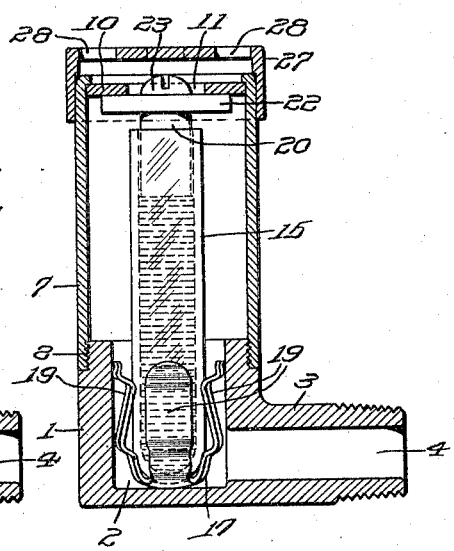
Figure 3:
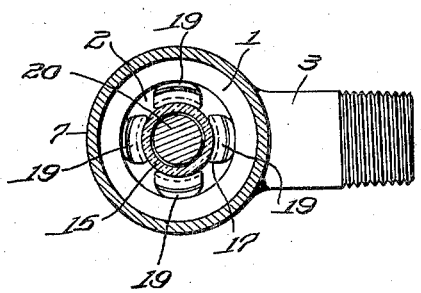

In the accompanying drawing Figure 1 is a central vertical section of one embodiment of my invention; Fig. 2 a similar view but with certain of the parts shown in elevation and in a slightly different position from that shown in Fig. 1, and Fig. 3 a transverse section taken on line 3—3 in Fig. 1.

Referring to the drawing, the form of the invention shown therein comprises a body 1 having an interior upwardly opening cavity 2 and a preferably integral nipple 3, provided with suitable screw threads, and adapted for attachment to a radiator, a passage 4 affording communication through the nipple with the cavity 2. A preferably tubular casing 7 is removably positioned upon the body over the mouth of the cavity, as by suitable screw threads 8, and provided adjacent its upper extremity with a transversely extending disk 10 suitably fixedly secured in the casing and provided with a central, preferably circular, aperture 11 adapted to permit the escape of air or vapor from the interior of the casing.

A tube 15, preferably formed of glass or other material unaffected by the action of mercury, and open at its upper and closed at its lower end, is removably positioned within cavity 2 and arranged to extend into the casing 7, the tube being suitably maintained in upright position with its sides spaced from the walls of the cavity and of the casing, as by means of a clip or holder 17 having a plurality of slightly flexible spring fingers 19 adapted to fit within the cavity and to contact with the walls of the cavity and with the tube, to maintain the tube in proper position without undue compression, and permit its unrestrained expansion or contraction under variations in temperature.

The tube is provided, adjacent its upper extremity, with a suitable loosely fitting piston 20 carrying at its upper end a transversely extending disk 22 fixedly secured to the piston in any suitable manner, as by a screw 23 extending through the disk and into the piston, which latter is preferably made of some material, such as steel, unaffected by the action of mercury, while the disk, and in fact all of the other parts of the invention hereinbefore described, except tube 15, may preferably be formed of brass, composition or other suitable material substantially unaffected by the action of steam, water or the like.

Contained within the tube 15, and forming a column therein, is a quantity of mercury 25 or other suitable liquid having a high coefficient of expansion, enough mercury being preferably supplied so that when the parts are in the position shown in Fig. 1, that is, with the disk 22 resting on the end of tube 15, the column of mercury will be adjacent, or in contact with, the bottom of the piston at ordinary room temperatures, although the quantity of mercury may be varied as desired to adapt the invention to various operative conditions encountered in practice. For the purpose of protecting those operative parts of the invention which would otherwise be exposed, and to more effectually prevent the entrance of foreign substances into the casing, a cap 27 having a plurality of openings 28 may be removably positioned over the upper end of the casing if desired.

The various parts having been constructed and assembled substantially as hereinbefore described, and attached to a radiator by the nipple 3, the operation of the invention may be briefly described as follows: When the steam or other heating medium is admitted to the radiator, presuming the radiator to be filled with cold air or vapor, the latter will be driven before the heating medium through passage 4, chamber 2, casing 7, and passing around and over disk 22 will be expelled through aperture 11 and openings 28, the parts remaining in the position, or substantially in the position, shown in Fig. 1, until the heating medium, or that part of the air or vapor directly preceding it which has necessarily been raised in temperature, effects the expansion of the mercury or other liquid in tube 15 to drive the piston and in turn disk 22 upwardly against disk 10, thus closing aperture 11 and thereby preventing the further escape of air or vapor from the radiator until the temperature in the vicinity of the tube is again lowered to a point to contract the mercury sufficiently to allow the piston and disk to move downwardly to partially or fully open aperture 11. It will be seen that the valve 22, as supported by the piston 20 and the mercury in the tube 13, is a floating valve and when in its lowermost position rests directly on the end of the tube and is supported thereby so that no top or closed end is necessary for the tube 15 nor is any stuffing box or other arrangement necessary for the proper operation of the valve by the thermostat. It has been found in practice that the invention is extremely sensitive and that by its use a considerable saving in steam or other heating medium is effected over the amount required when air valves of the types known and in use prior to my invention are employed, and furthermore, that by the use of my invention it is possible to bring a radiator from a cold state to its maximum heat in a minimum of time after the heating medium is admitted to the radiator.

While I have herein illustrated and described a single embodiment of my invention with considerable particularity, I do not thereby desire or intend to limit myself specifically to such form, as various changes and modifications may be made in the form and arrangement of the details of construction and arrangement of the various parts of the invention as desired, without departing from the spirit and scope of the invention as defined in the appended claims.

Having thus described my invention I claim and desire to protect by Letters Patent of the United States:—

1. In a device of the class described, the combination of an outer casing adapted to be secured to a radiator and having an opening adjacent its upper extremity for permitting the escape of air from said radiator, an open ended tube within said casing maintained in operative fixed relation with said casing, said tube adapted to contain an expansible liquid, a piston slidable in said tube and a floating valve operated by said piston for controlling the opening in said casing in conformity with the height of the liquid in said tube, said valve adapted to rest on and be directly supported by the tube when in position to maintain open the opening in said casing.

2. In a device of the class described, the combination of an outer casing adapted to be secured to a radiator and having an opening adjacent its upper extremity for permitting the escape of air from said radiator, a tube within said casing, said tube adapted to contain an expansible liquid, a piston slidable in and guided solely by said tube and a floating valve carried directly by said piston for controlling the opening in said casing in conformity with the height of the liquid in said tube, said valve adapted to rest on and be directly supported by the tube when in position to maintain open the opening in said casing.

3. In a device of the class described, the combination of an outer casing adapted to be secured to a radiator and having an opening for permitting the escape of air therefrom, a thermostat for controlling said opening, including a tube for containing an expansible liquid, and a spring clip for supporting said tube in operative position comprising a base and a plurality of spring fingers bent so as to engage both the tube and the walls of the casing to properly position the tube relatively thereto.

4. In a device of the class described, the combination with a base adapted for attachment to a radiator and having a cavity, a tube extending in said cavity, means supporting said tube in operatively fixed relation with said base and comprising a clip having a plurality of flexible fingers for engaging both said tube and the walls of said base, a casing surrounding said tube and having an opening, a piston in said tube, a disk carried by said piston, and a column of mercury in said tube, said disk being operative to open and close said opening as said piston is actuated through the contraction and expansion of the mercury in said tube.

5. In a device of the class described, the combination with a hollow base adapted for attachment to a radiator, means for establishing communication between said base and the interior of the radiator, a casing surrounding said base, a tube for containing an expansible liquid, means carried by said tube operative to control the opening in the casing in conformity with the expansion or contraction of the liquid in said tube, and means for supporting said tube in operative fixed removable relation with said casing including a plurality of flexible fingers so bent as to contact with the outer wall of the tube and the inner wall of the base.

In witness whereof, I have hereunto set my hand this 2nd day of March, A. D., 1917.

VAN VECHTON RIESBERG.

Copies of this patent may be obtained for five cents each, by addressing the "Commissioner of Patents, Washington, D. C."